United States Patent
Huo et al.

(10) Patent No.: US 9,655,153 B2
(45) Date of Patent: May 16, 2017

(54) METHOD AND APPARATUS FOR NOTIFYING CONNECTION ATTRIBUTES FOR LOCAL INTERNET PROTOCOL (IP) ACCESS

(75) Inventors: Yuzhen Huo, Shenzhen (CN); Na Zhou, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 895 days.

(21) Appl. No.: 13/386,412

(22) PCT Filed: May 25, 2010

(86) PCT No.: PCT/CN2010/073214
§ 371 (c)(1),
(2), (4) Date: Jan. 21, 2012

(87) PCT Pub. No.: WO2011/012012
PCT Pub. Date: Feb. 3, 2011

(65) Prior Publication Data
US 2012/0117257 A1     May 10, 2012

(30) Foreign Application Priority Data
Jul. 30, 2009 (CN) .......................... 2009 1 0089978

(51) Int. Cl.
*G06F 15/16* (2006.01)
*H04W 76/02* (2009.01)
(Continued)

(52) U.S. Cl.
CPC ....... *H04W 76/022* (2013.01); *H04L 41/0806* (2013.01); *H04W 28/18* (2013.01);
(Continued)

(58) Field of Classification Search
CPC .... H04L 12/28; H04L 41/0806; H04W 28/18; H04W 36/0033; H04W 36/0066
(Continued)

(56) References Cited

U.S. PATENT DOCUMENTS

| | | | |
|---|---|---|---|
| 2005/0091388 A1* | 4/2005 | Kamboh | H04L 12/2856 709/228 |
| 2007/0165630 A1* | 7/2007 | Rasanen et al. | 370/389 |

(Continued)

FOREIGN PATENT DOCUMENTS

| | | |
|---|---|---|
| CN | 1913713 A | 2/2007 |
| CN | 101047958 A | 10/2007 |
| CN | 101150473 A | 3/2008 |

OTHER PUBLICATIONS

International Search Report for PCT/CN2010/073214 dated Aug. 23, 2010.
(Continued)

*Primary Examiner* — Oleg Survillo
(74) *Attorney, Agent, or Firm* — Ling Wu; Stephen Yang; Ling and Yang Intellectual Property (57) ABSTRACT

The invention discloses a method for notifying connection attributes of local IP access, comprising a mobility management element notifying the user terminal of connection attributes of the PDN connection in the procedure of establishing a PDN connection. The invention also discloses an apparatus for notifying connection attributes of local IP access, comprising: a determination unit for determining connection attributes of the PDN connection for user terminal in the process of establishing the PDN connection; a notification unit for notifying the user terminal of the connection attributes of the PDN connection. After determining the PDN connection to be established for UE, the mobility management element at the network side of the invention notifies the UE of the information of type and
(Continued)

attribute of the PDN connection at the same time so as to facilitate the UE determining the corresponding access policy according to the attribute information of current PDN connection when moving.

17 Claims, 4 Drawing Sheets (51) Int. Cl.
  *H04W 36/00* (2009.01)
  *H04W 28/18* (2009.01)
  *H04L 12/24* (2006.01)
  *H04L 12/28* (2006.01)
  *H04W 8/08* (2009.01)

(52) U.S. Cl.
  CPC ... *H04W 36/0033* (2013.01); *H04W 36/0066* (2013.01); *H04L 12/28* (2013.01); *H04W 8/082* (2013.01)

(58) Field of Classification Search
  USPC ............... 709/201–230; 370/331–340, 389
  See application file for complete search history.

(56) References Cited

U.S. PATENT DOCUMENTS

| | | | | |
|---|---|---|---|---|
| 2007/0186273 | A1* | 8/2007 | Carpy | H04L 63/0281 726/2 |
| 2009/0129363 | A1* | 5/2009 | Lindsey | H04L 12/2816 370/345 |
| 2009/0177476 | A1* | 7/2009 | Darrell | G10L 15/22 704/275 |
| 2009/0234956 | A1* | 9/2009 | Wang | H04W 48/17 709/228 |
| 2010/0189010 | A1* | 7/2010 | Black et al. | 370/254 |
| 2010/0234029 | A1* | 9/2010 | Ishii | H04W 36/0066 455/437 |
| 2010/0272068 | A1* | 10/2010 | Park | H04W 36/0011 370/331 |
| 2010/0284299 | A1* | 11/2010 | Bi et al. | 370/253 |
| 2010/0323700 | A1* | 12/2010 | Bachmann et al. | 455/436 |
| 2010/0329149 | A1* | 12/2010 | Singh et al. | 370/254 |
| 2011/0003545 | A1* | 1/2011 | Vainikka | H04W 48/20 455/9 |
| 2011/0090870 | A1* | 4/2011 | Ronneke | H04W 76/046 370/331 |
| 2011/0286430 | A1* | 11/2011 | Zembutsu et al. | 370/331 |
| 2012/0039214 | A1* | 2/2012 | Kim | H04L 12/14 370/254 |
| 2012/0039323 | A1* | 2/2012 | Hirano et al. | 370/338 |
| 2012/0069737 | A1* | 3/2012 | Vikberg | H04W 28/12 370/232 |
| 2012/0179790 | A1* | 7/2012 | Kim | H04L 67/22 709/220 |

OTHER PUBLICATIONS

"On HNB and HeNB interfaces for LIPA"; Alcatel-Lucent; 7.4.5; Rel-9; 3GPP TSG SA WG2 Meeting #73, May 11-15, 2009, Tallinn, Estonia; ; TD S2-093378; see pp. 1-4.

"Local IP access principles for single PDN connection solutions"; China Mobile; SA2; EHNB; B; Rel-9; 3GPP TSG-SA2 Meeting #73, Tallinn, Estonia, May 11-15, 2009; S2-093803; see pp. 1-26.

"General Packet Radio Service(GPRS) Enhancements for Evolved Universal Terrestrial Radio Access Network (E-UTRAN) access"; 3rd Generation Partnership Project; Technical Specification Group Services and System Aspects; ; Release 9; 3GPP TS 23.401; V9.1.0, 2009; the whole document.

* cited by examiner

METHOD AND APPARATUS FOR NOTIFYING CONNECTION ATTRIBUTES FOR LOCAL INTERNET PROTOCOL (IP) ACCESS

TECHNICAL FIELD

The invention relates to technologies of determination and notification of connection attributes and, in particular, to a method and an apparatus for notifying connection attributes of local internet protocol (IP) access.

BACKGROUND OF THE RELATED ART

An Evolved Packet System (EPS) of the $3^{rd}$ Generation Partnership Project (3GPP) is composed of an Evolved Universal Terrestrial Radio Access Network (E-UTRAN), a Mobility Management Entity (MME), a Serving Gateway (S-GW), a Packet Data Network Gateway (P-GW or PDN GW), a Home Subscriber Server (HSS), a 3GPP Authentication Authorization Accounting (AAA) server, a Policy and Charging Rules Function (PCRF) entity and other supporting nodes.

Figure 1:
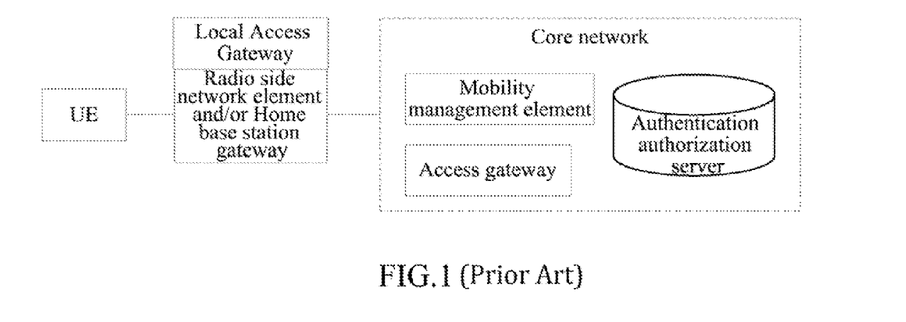
FIG. 1 is a schematic diagram of system architecture of the EPS.

FIG. 1 is a schematic diagram of system architecture of EPS. As illustrated in FIG. 1, the MME is responsible for the related work of a control plane, such as the mobility management, processing of Non-Access stratum signaling and management of the user mobility management context and so on; an access gateway comprises a S-GW and a P-GW, wherein the S-GW is an access gateway device connected with the E-UTRAN, which forwards data between the E-UTRAN and the P-GW and is responsible for performing buffering on the paging waiting data; and the P-GW is a border gateway of the EPS and the packet data network (PDN), which is responsible for functions such as the access of the PDN and forwarding data between the EPS and the PDN and so on; an authentication authorization server comprises a HSS and a 3GPP AAA and so on; the PCRF is a policy and charging rules function entity which is connected with the IP service network of an operator through a receiving interface Rx and obtains the service information, and additionally the PCRF is connected with the gateway devices in the network through Gx/Gxa/Gxc interfaces and is responsible for initiating the establishment of IP bearer, ensuring the Quality of Service (QoS) of the service data and performing the charging control.

As a new kind of access service way, a home base station is a small and low-power base station, which is deployed in indoor locations such as home and office and so on, and the main function is to provide a higher service rate for the user and lower the cost required for use of high rate service and meanwhile make up for the lack of coverage of the existing distributed cell radio communication system. The advantages of a home base are cost-effectiveness, convenience, low-power output and Plug and Play and so on.

The home base station can be directly connected to a core network and, as illustrated in FIG. 1, can also access the core network by a logical network element, that is a home base station gateway, wherein the main functions of the home base station gateway are verifying the security of the home base station, processing registration of the home base station, performing operation, maintenance and management of the home base station, configuring and controlling the home base station according to the requirements of the operator, and taking charge of exchanging data between the core network and the home base station. The access gateway can be a S-GW, a P-GW, a Serving GPRS Support Node (SGSN), or a Gateway GPRS Support Node (GGSN). The local access gateway can be a Local SGW (L-SGW), a local PGW (L-PGW), a Virtual SGW (V-SGW), a Virtual PGW (V-PGW), or a Local GGSN (L-GGSN) and can also be a traffic offload function entity. The local access gateway can be collocated with a radio side network element together or can be set in the vicinity of the radio side network element, and can also be collocated with the home base station gateway together or can be set in the vicinity of the home base station gateway.

Figure 2:
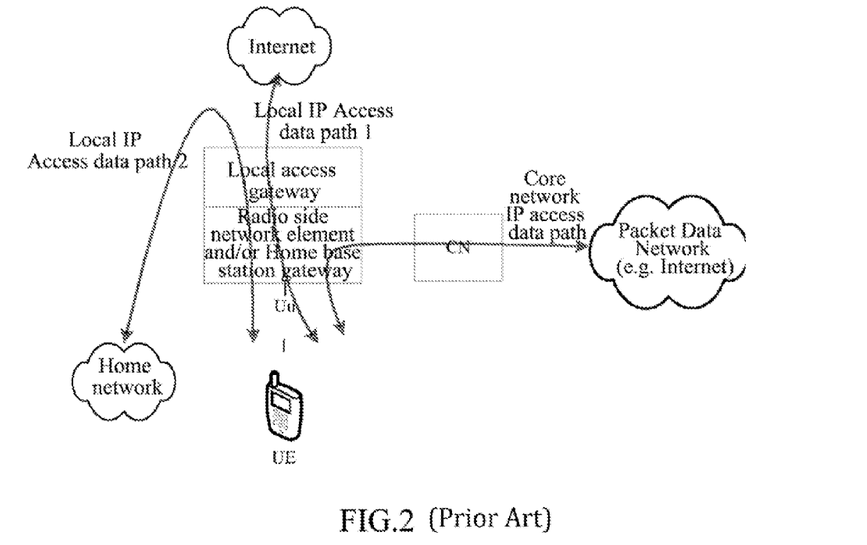
FIG. 2 is a schematic diagram showing a data flow path of the local IP access and the traditional core network IP access.

FIG. 2 is a schematic diagram showing a data flow path of local IP access and traditional core network IP access. As illustrated in FIG. 2, in order to achieve the Local IP Access (LIPA) function and to make the UE achieve local access to other IP devices in the home network or local access to internet, a local access gateway is added, which may provide powerful support to the local IP access technology, wherein the local access gateway can be collocated with a radio side network element together or can be set in the vicinity of the radio side network element, and can also be collocated with a home base station gateway together or can be set in the vicinity of the home base station gateway. As for users supporting the local IP access, a traditional core network IP access data path and a local IP access data path can be established. As for a LIPA connection, the local IP access data path is from the UE to the radio side network element/home base station gateway to the local access gateway (L-SGW, L-PGW), but the data transmission is not through the core network. In order to make UE achieve the local access to other IP devices in the home network or the local access to internet, two connections can be established, wherein the first local IP access data path directly accesses the internet (an internet LIPA connection), and the second local IP access data path directly accesses other IP devices of the home network (a home network LIPA connection).

The UE user can actively apply for establishing a LIPA connection according to its own will, for example, notifying the core network that it is required to establish a LIPA connection by using a particular access point name, and at that time the mobility management element judges whether a LIPA connection can be established for that application of user according to user subscription, or the capability of radio side network element/home base station gateway. If the LIPA connection cannot be established, a core network connection can be directly established. The UE can also use a normal access point name to initiate services, and the mobility management element directly decides whether to establish the LIPA connection or the core network connection for the application of user according to the operator's policy, subscription, or the capability of radio side network element/home base station gateway. After deciding to establish the LIPA connection for the user, the mobility management element also needs to check whether the LIPA connection established for the user supports mobility (i.e. service continuity).

However, the UE does not know the type of the current connection, that is, the UE does not know whether the current connection is the local IP access connection or the core network connection. If it is the local IP access connection, the UE also does not know whether the local IP access connection supports mobility. When the UE needs to initiate service requests after moving in the idle state, only the core network connection or the LIPA connection supporting mobility can be activated. After handover, only the core network connection or the LIPA connection supporting mobility can be relocated to a new base station. However, as for the LIPA connection that does not support mobility, the UE can reestablish it in a new base station. Therefore, the UE needs to know which of the established connections are LIPA connections and which LIPA connection does not support mobility so as to complete suitable operation after the UE moves.

SUMMARY OF THE INVENTION

In view of this, the main purpose of the invention is to provide a method and an apparatus for notifying connection attributes of local IP access, which is capable of notifying the UE of the attributes of the current connection of the UE to facilitate the UE performing switching operation.

In order to achieve the above purpose, the technical scheme of the invention is achieved as follows.

A method for notifying connection attributes of local IP access comprises:

in a procedure of establishing a packet data network (PDN) connection or bearer, a mobility management element notifying the user terminal of connection attributes of the PDN connection or bearer.

Preferably, the procedure of establishing the PDN connection comprises a user Attach procedure, a UE requested PDN connectivity procedure, or a Packet Data Protocol (PDP) context activation procedure.

Preferably, the procedure of establishing the bearer comprises a Dedicated Bearer Activation Procedure, a UE requested bearer resource modification procedure, or a Secondary PDP Context Activation Procedure.

Preferably, the connection can be the PDN connection or the bearer in the PDN connection.

Preferably, the connection comprises a core network connection or a local IP access (LIPA) connection.

Preferably, the connection attributes of the connection are the LIPA connection, or the core network connection, or the internet LIPA connection, or the home network LIPA connection, or the user local LIPA connection, or the intranet local LIPA connection, or an internet traffic offload connection, or a selected IP traffic offload connection, and/or whether the connection supports mobility.

Preferably, the connection attributes of the connection are borne in an attach accept message, or in a PDN connectivity accept message, or in an Activate default EPS bearer context message, or in an Activate dedicated EPS bearer context request message, or in an Activate Packet Data Protocol (PDP) context accept message, or in an Activate secondary PDP context accept message; or in a dedicated bearer message set for connection attributes of the connection.

Preferably, the connection attributes of the connection are specifically borne in an Evolved Packet System (EPS) attach result information element in the attach accept message, or in a ESM cause information element in the Activate default EPS bearer context request message, or in a new cause information element in the Activate dedicated EPS bearer context message, or in a SM cause information element in the Activate PDP context accept message, or in a new cause information element in the Activate secondary PDP context accept message; or in a new dedicated information element in the attach accept message or the Activate default EPS bearer context request message or the Activate dedicated EPS bearer context message or the Activate PDP context accept message or the Activate secondary PDP context accept message.

Preferably, the mobility management element stores the connection attributes of the connection after determining the connection attributes of the connection.

Preferably, the user terminal stores the connection attributes of the connection received from the mobility management element or the local access gateway.

Preferably, the mobility management element comprises a Mobility Management Entity (MME), a Mobile Switching Center (MSC) or a Serving GPRS Support Node (SGSN).

Preferably, the LIPA connection comprises an internet LIPA connection or a home network LIPA connection or a user local LIPA connection or an intranet local LIPA connection or an internet traffic offload connection, or a selected IP traffic offload connection.

An apparatus for notifying connection attributes of local IP access comprises:

a determination unit for determining the connection attributes of the Packet Data Network (PDN) connection or bearer for user terminal in a procedure of establishing the PDN connection or bearer; and a notification unit for notifying the user terminal of the connection attributes of the PDN connection or bearer.

Preferably, the procedure of establishing the PDN connection comprises a user attach procedure, a UE requested PDN connectivity procedure, or a Packet Data Protocol (PDP) context activation procedure.

Preferably, the procedure of establishing the bearer comprises a Dedicated Bearer Activation Procedure, a UE requested bearer resource modification procedure, or a Secondary PDP Context Activation Procedure.

Preferably, the connection may be the PDN connection and the bearer in the PDN connection.

Preferably, the connection comprises the core network connection or the local IP access (LIPA) connection or the user local LIPA connection or the intranet local LIPA connection or an internet traffic offload connection, or a selected IP traffic offload connection.

Preferably, the connection attributes of the connection are the LIPA connection, or the core network connection, or the internet LIPA connection, or the home network LIPA connection, or the user local LIPA connection, or the intranet local LIPA connection, or the internet traffic offload connection, or the selected IP traffic offload connection, and/or whether the PDN connection supports mobility.

Preferably, the notification unit comprises:

a bearer module for bearing the connection attributes of the connection in an attach accept message, or in a PDN connectivity accept message, or in an Activate default EPS bearer context request message, or in an Activate dedicated EPS bearer context message, or in an Activate Packet Data Protocol (PDP) context accept message; or an Activate secondary PDP context accept message or in a dedicated bearer message set for the connection attributes of the PDN connection; and a transmission module for sending messages bearing the connection attributes of the connection.

Preferably, the bearer module specifically bears the connection attributes of the connection in an Evolved Packet System (EPS) attach result information element in the attach accept message, or a cause information element in the Activate default EPS bearer context request message, or a new cause information element in the Activate dedicated EPS bearer context message, or in a cause information element in the Activate PDP context accept message, or a new cause information element in the Activate secondary PDP context accept message; or in a new dedicated information element in the attach accept message or the Activate default EPS bearer context request message or the Activate dedicated EPS bearer context message or the Activate PDP context accept message or the Activate secondary PDP context accept message.

In the invention, after determining a connection to be established for UE, the mobility management element at the network side notifies the UE of the information of type and attribute of the connection at the same time so as to facilitate the UE determining the corresponding access policy according to the attribute information of the current connection when moving. The scheme of the invention is simply carried out and is practical.

PREFERRED EMBODIMENTS OF THE PRESENT INVENTION

The basic idea of the invention is that after the mobility management element at the network side determines a connection to be established for UE, the type and attribute information of the connection are notified to the UE at the same time so as to facilitate the UE determining a corresponding access policy according to the attribute information of the current connection when moving. The scheme of the invention is simply carried out and practical.

In the present invention, a connection can refer to a PDN connection and can also be the bearer in the PDN connection.

In the present invention, the local IP access may be local IP access user local network, local IP access intranet local network, local IP access internet, internet traffic offload, or selected IP traffic offload.

In order to make the purpose, technical scheme and advantages of the present invention clearer and more obvious, the invention is further described in detail by numerating embodiments in combination with the accompanying drawings.

Figure 3:
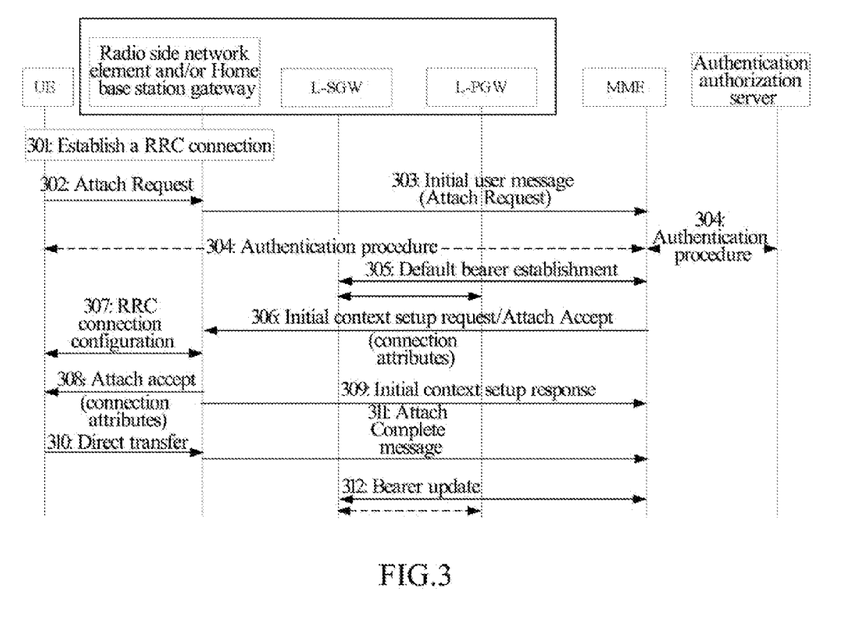
FIG. 3 is a flowchart of the first embodiment of the method for notifying connection attributes of local IP access according to the invention.

FIG. 3 is a flowchart of the first embodiment of the method for notifying connection attributes of local IP access according to the invention. As illustrated in FIG. 3, the method for notifying connection attributes of local IP access in the embodiment comprises the following steps:

Step 301, UE needs to establish a Radio Resource Control (RRC) connection as a bearer of signaling message or service data before performing communication.

Step 302, the UE sends an initial Non-Access Stratum (NAS) message (an Attach Request message) for performing attachment operation.

Step 303, a radio side network element (or a home base station) sends an initial UE message to a mobility management element and forwards the Attach Request to the mobility management element. If there is a home base station gateway, the message is firstly forwarded to the home base station gateway and then is sent to the mobility management element by the home base station gateway. The mobility management element in the LTE system is a MME.

Step 304, the mobility management element initiates an authentication procedure for the user, and the authentication related information is exchanged between the mobility management element and the HSS as required; after the authentication succeeds, the mobility management element initiates a location update procedure, and the HSS sends the subscription data of the user to the mobility management element.

Step 305, the mobility management element checks whether a local IP connection (LIPA connection) needs to be established according to an Access Point Name (APN) or local access identifiers (these identifiers can be carried in the message of step 303), subscription information of the user or an operator policy and so on. If the LIPA connection needs to be established, an L-PGW and an L-SGW located at the radio side network element/home base station gateway are selected for user service, and a default bearer establishment procedure is initiated to the L-SGW.

At this time the MME needs to set and store that the connection attribute of the connection being established is a LIPA connection. The MME can also judge which of an internet LIPA connection, a home network LIPA connection, a user local LIPA connection, an intranet LIPA connection, a internet traffic offload connection or a selected IP traffic offload connection the connection specifically is, and stores the information. MME can also judge whether the connection being established by the user supports mobility, that is, service continuity according to the APN or the local access identifiers or the operator policy or the subscription information, and stores the information.

If the MME judges that a core network connection needs to be established, the connection attributes can be set to be the core network connection.

Step 306, after the default bearer is successfully established, the mobility management element sends an initial context setup request to the radio side network element and a NAS message (Attach Accept message) is included in the message, and at the same time the Attach Accept message also includes an Activate default EPS bearer context request message. If there is a home base station gateway, the message is firstly forwarded to the home base station gateway and then is sent to the radio side network element by the home base station gateway. At this time, the mobility management element includes the connection attributes judged in step 305 in the Attach Accept message.

Here, the connection attributes can be borne in the EPS attach result information element in the Attach Accept message and can also be borne in the ESM cause information element in the Activate default EPS bearer context request message. Or a new information element is added in the above message to bear the connection attributes. Or a new dedicated message for bearing the connection attributes is set.

Here, the connection attributes are that the connection is a LIPA connection, an internet LIPA connection, a home network LIPA connection, a user local LIPA connection or intranet LIPA connection, an internet traffic offload connection, or a selected IP traffic offload connection, and/or whether the connection supports mobility. The connection attributes can also be a core network connection.

Step 307, a process of configuring a RRC connection is implemented.

Step 308, the Attach Accept message and the Activate default EPS bearer context request message are sent to the UE individually. At the same time, the connection attributes included in the messages are also forwarded to the UE. The UE stores the obtained connection attributes.

Step 309, the radio side network element replies to a mobility management element with an initial context setup response. If there is a home base station gateway, the message is firstly forwarded to the home base station gateway and then is sent to the mobility management element by the home base station gateway.

Step 310, the UE sends a direct transfer message to the radio side network element, which includes Attach Complete message.

Step 311, the radio side network element sends an Attach Complete message to the mobility management element. If there is a home base station gateway, the message is firstly forwarded to the home base station gateway and then is sent to the mobility management element by the home base station gateway.

Step 312, the mobility management element implements a bearer update process.

In the embodiment, the local access gateway is the L-PGW and the L-SGW, and the L-SGW is located at the radio side network element/home base station gateway. As to that the attach procedure is similar to the present procedure in the absence of the L-SGW, only the MME needs to directly perform message interaction with the L-PGW, and the L-SGW does not participate in the process any more, which is not repeated here. As to that the attach procedure is the same as the present process when L-SGW is located at the core network, only the MME needs to perform message interaction with the SGW of the core network, which is not repeated here.

Figure 4:
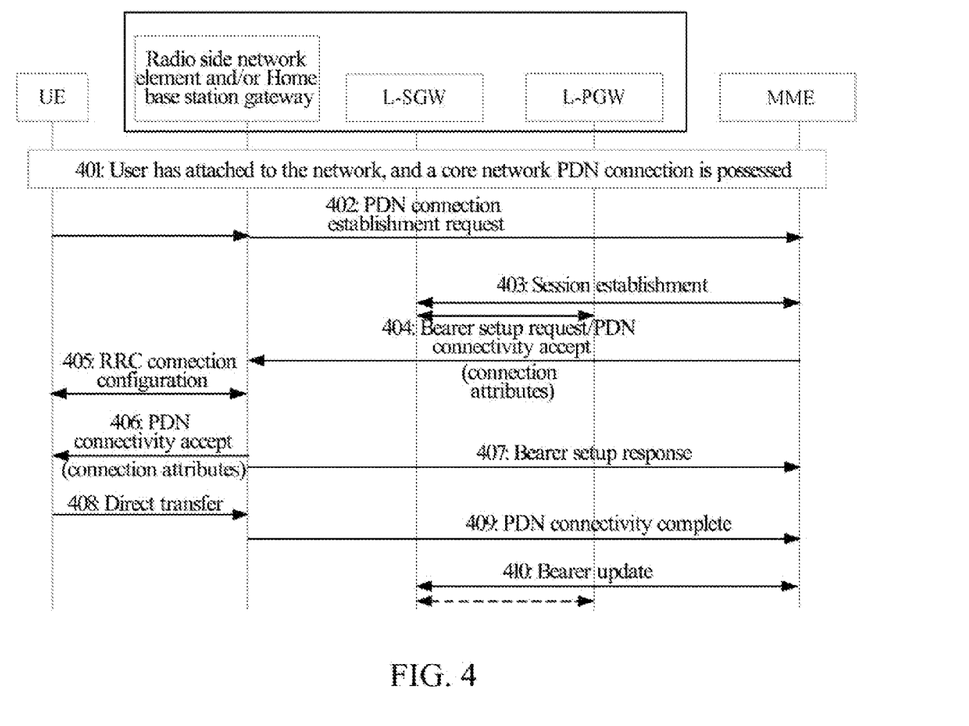
FIG. 4 is a flowchart of the second embodiment of the method for notifying connection attributes of local IP access according to the invention.

FIG. 4 is a flowchart of the second embodiment of the method for notifying connection attributes of local IP access according to the invention. As illustrated in FIG. 4, the method for notifying connection attributes of local IP access in the embodiment comprises the following steps:

Step 401, the user has attached to the network, and a core network PDN connection is established.

Step 402, the UE initiates a PDN Connectivity request to the mobility management element via the radio side network element. If there is a home base station gateway, the message is firstly forwarded to the home base station gateway and then is sent to the mobility management element by the home base station gateway, wherein the mobility management element in the LTE system is the MME.

Step 403, the mobility management element checks whether a local IP connection (LIPA connection) needs to be established according to an APN or local access identifiers (these identifiers can be carried in the message of step 402), user subscription information or an operator policy and so on. If the LIPA connection needs to be established, an L-PGW and an L-SGW located at the radio side network element/home base station gateway are selected for user service, and a session establishment procedure is initiated to the L-SGW.

At this time MME needs to set and store that the connection attribute of the connection being established is the LIPA connection. Furthermore, the MME can also judge which of an internet LIPA connection, a home network LIPA connection, a user local LIPA connection, an intranet LIPA connection, a internet traffic offload connection or a selected IP traffic offload connection the connection specifically is, and stores the information. At the same time, the MME can also judge whether the connection being established by the user supports mobility, that is, service continuity, according to the APN or the local access identifiers or the operator policy or the subscription information, and stores the information. If MME judges that a core network connection needs to be established, the connection attributes can be set to be a core network connection.

Step 404, after a session is successfully established, the mobility management element sends a bearer setup request message to the radio side network element, and a NAS message which is PDN connectivity accept message (or an Activate default EPS bearer context request message) is included in the message. If there is a home base station gateway, the message is firstly forwarded to the home base station gateway and then is sent to the radio side network element by the home base station gateway. At this time, the mobility management element includes the connection attributes judged in the step 403 in the PDN connectivity accept message (or the Activate default EPS bearer context request message).

In the step, the connection attributes can be borne in an existing information element in the PDN connectivity accept message, or in a ESM cause information element in the Activate default EPS bearer context request message, or a new information element is added in the message to bear the connection attributes. Or a new dedicated message for bearing connection attributes is set.

The connection attributes sent by the mobility management element are that the connection is the LIPA connection, the internet LIPA connection, the home network LIPA connection, the user local LIPA connection, the intranet LIPA connection, the internet traffic offload connection or the selected IP traffic offload connection, and/or whether the connection supports mobility. The connection attributes can also be the core network connection.

Step 405, a process of configuring a RRC connection is implemented.

Step 406, the PDN connectivity accept message (or the Activate default EPS bearer context request message) is sent to the UE individually. At the same time, the connection attributes included in the message are also forwarded to the UE. The UE stores the obtained connection attributes.

Step 407, the radio side network element replies to the mobility management element with a bearer setup response. If there is a home base station gateway, the message is firstly forwarded to the home base station gateway and then is sent to the mobility management element by the home base station gateway.

Step 408, the UE sends a direct transfer message to the radio side network element, which comprises a PND connectivity complete message.

Step 409, the radio side network element sends the PDN connectivity complete message to the mobility management element. If there is a home base station gateway, the message is firstly forwarded to the home base station gateway and then is sent to the mobility management element by the home base station gateway.

Step 410, the mobility management element implements a bearer update process.

In the embodiment, the local access gateway is the L-PGW and the L-SGW, and the L-SGW is located at the radio side network element/home base station gateway. As to that the PDN connectivity procedure is similar to the present process in the absence of the L-SGW, only the MME needs to directly perform message interaction with the L-PGW, and the L-SGW does not participate in the process any more, which is not repeated here. As to that the PDN connectivity procedure is the same as the present process when L-SGW is located at the core network, only MME needs to perform message interaction with the SGW of the core network, which is not repeated here.

Figure 5:
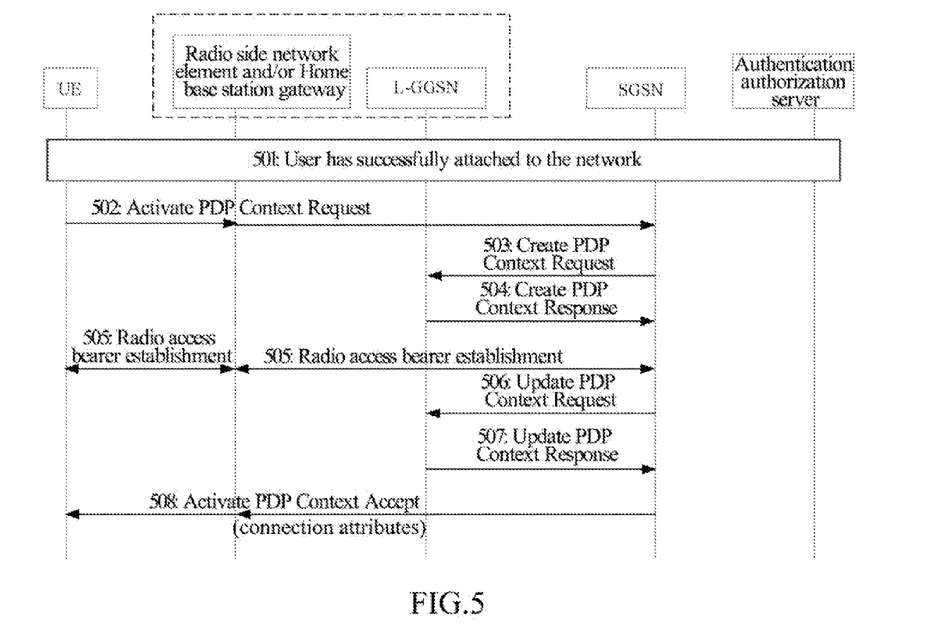
FIG. 5 is a flowchart of the third embodiment of the method for notifying connection attributes of local IP access according to the invention.

FIG. 5 is a flowchart of the third embodiment of the method for notifying connection attributes of local IP access according to the invention. As illustrated in FIG. 5, the method for notifying connection attributes of local IP access in the embodiment comprises the following steps:

Step 501, the UE is successfully attached to the network by implementing the attach procedure.

Step 502, the UE sends an Activate PDP Context Request message to the mobility management element SGSN through the radio side network element. If there is a home base station gateway, the message is firstly forwarded to the home base station gateway and then is sent to the mobility management element by the home base station gateway, wherein the mobility management element in the UTRAN system is a SGSN.

Step 503, the mobility management element checks whether a local IP connection (LIPA connection) needs to be established according to an APN or local access identifiers (these identifiers can be carried in the message of step 502), user subscription information or an operator policy and so on. If the LIPA connection needs to be established, an L-GGSN located at the radio side network element/home base station gateway is selected for user service. The SGSN sends a Create PDP Context Request to the L-GGSN.

At this time, the SGSN needs to set and store that the connection attribute of the connection being established is the LIPA connection. The SGSN can also judge which of an internet LIPA connection, a home network LIPA connection, a user local LIPA connection, an intranet LIPA connection, a internet traffic offload connection or a selected IP traffic offload connection the connection specifically is, and stores the information. At the same time, the SGSN can also judge whether the connection being established by the user supports mobility, that is, service continuity, according to the APN or the local access identifiers or the operator policy or the subscription information, and stores the information. When the SGSN judges that a core network connection needs to be established, the connection attributes can be set to be a core network connection.

Step 504, the L-GGSN replies to SGSN with a Create PDP Context Response when the message sent by the SGSN is received.

Step 505, a radio access bearer establishment process is implemented.

Step 506, the SGSN may send an Update PDP Context Request to the L-GGSN, notifying the L-GGSN of the modified QoS parameters.

Step 507, the L-GGSN replies to SGSN with an Update PDP Context Response.

Step 508, after the bearer is successfully established, the mobility management element sends an Activate PDP Context Accept message to the UE through the radio side network element. If there is a home base station gateway, the message is firstly forwarded to the home base station gateway and then is sent to the radio side network element by the home base station gateway. At this time, the mobility management element includes the connection attributes judged in step 503 in the Activate PDP Context Accept message and sends it to the UE. In the step, the connection attributes are borne in a SM cause information element in the Activate PDP Context Accept message. Or a new information element is added in the message to bear. Or a new dedicated message for bearing the connection attributes is set.

The connection attributes determined by the SGSN are that the connection is the LIPA connection, the internet LIPA connection, the home network LIPA connection, the user local LIPA connection, the intranet LIPA connection, the internet traffic offload connection or the selected IP traffic offload connection, and/or whether the connection supports mobility. The connection attributes can also be the core network connection.

As for a terminal that only supports a single PDN connection, bearers of different connection attributes can be established under the same PDN connection to achieve the core network access and the local IP access at the same time. When a UE requested bearer resource modification procedure, or a Dedicated Bearer Activation Procedure initiated by the network or a Secondary PDP Context Activation Procedure is initiated, the mobility management element or the local gateway needs to notify the terminal of the connection attributes of the bearers. In the UE requested bearer resource modification procedure and the Dedicated Bearer Activation Procedure initiated by the network, the mobility management element or the local gateway bears the connection attributes of the bearers in a new cause information element or a new dedicated information element in the Activate dedicated EPS bearer context request message. In the Secondary PDP Context Activation Procedure, the mobility management element or the local gateway bears the connection attributes of the bearers in a new cause information element or a new dedicated information element in the Activate Secondary PDP Context Accept message. In the above three procedures, a new dedicated bearer message can be used.

The connection attributes of the bearer are that the connection is the LIPA connection, the internet LIPA connection, the home network LIPA connection, the user local LIPA connection, the intranet LIPA connection, the internet traffic offload connection or the selected IP traffic offload connection, and/or whether the connection supports mobility. The connection attributes can also be the core network connection.

In the above embodiments, the mobility management element comprises a Mobility Management Entity (MME), a Mobile Switching Center (MSC) or a Serving GPRS Support Node (SGSN) and so on.

In the above embodiments, the connection attributes are all sent by the mobility management element, and can also be sent by the local gateway, the procedure of which is similar to that of the above embodiments. It is not repeated here.

Figure 6:
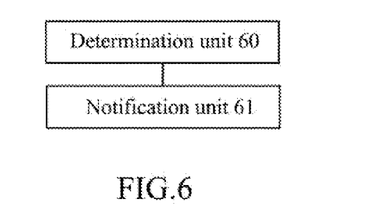
FIG. 6 is a schematic diagram of composition structure of the apparatus for notifying connection attributes of local IP access according to the invention.

FIG. 6 is a schematic diagram of a composition structure of the apparatus for notifying connection attributes of local IP access according to the invention. As illustrated in FIG. 6, the apparatus for notifying connection attributes of local IP access according to the invention comprises a determination unit 60 and a notification unit 61, wherein the determination unit 60 is used to determine the connection attributes of the connection or bearer for the user terminal in the procedure of the connection establishment; the connection comprises a core network connection or a local IP access (LIPA) connection. The local IP access (LIPA) connection comprises an internet LIPA connection, a home network LIPA connection, a user local LIPA connection, an intranet LIPA connection, a internet traffic offload connection or a selected IP traffic offload connection. The connection attributes of the connection and bearer are the LIPA connection, or the connection attributes are the internet LIPA connection, the home network LIPA connection, the user local LIPA connection, the intranet LIPA connection, the internet traffic offload connection or the selected IP traffic offload connection, or the connection attribute is a core network connection, and/or whether the connection supports mobility. The notification unit 61 is used to notify the user terminal of the connection attributes of the connection.

Figure 7:
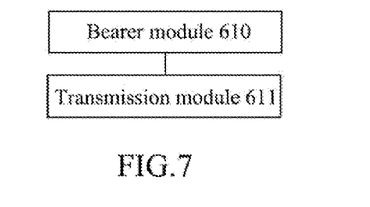
FIG. 7 is a schematic diagram of composition structure of the notification unit of the apparatus for notifying connection attributes of local IP access according to the invention.

FIG. 7 is a schematic diagram of composition structure of the notification unit of the apparatus for notifying connection attributes of local IP access according to the invention. As illustrated in FIG. 7, the notification unit 61 of the invention comprises a bearer module 610 and a transmission module 611, wherein the bearer module 610 is used to bear the connection attributes of the connection in the attach accept message, or in the PDN connectivity accept message, or in the Activate default EPS bearer context request message, or in the Activate dedicated EPS bearer context request message, or in the Activate PDP Context Accept message, or in the Activate Secondary PDP Context Accept message; or in the dedicated bearer message set for the connection attributes of the connection. Specifically, the bearer module 610 specifically bears the connection attributes of the connection in an EPS attach result information element in the attach accept message, or in a ESM cause information element in the Activate default EPS bearer context request message, or a new cause information element in the Active dedicated EPS beater context request message, or a cause information element in the Activate PDP Context Accept message, or a new cause information element in the Activate Secondary PDP Context Accept message; or in a new dedicated information element in the attach accept message or the Activate default EPS bearer context request message or the Active dedicated EPS beater context request message or the Activate PDP Context Accept message or the Activate Secondary PDP Context Accept message. The transmission module 611 is used to send the messages for bearing the attributes of the connection.

The above connection is the PDN connection or the bearer in the PDN connection, wherein the procedure of establishing the PDN connection comprises an attach procedure, a UE requested PDN connectivity procedure, or a PDP context activation procedure; the procedure of establishing the bearer in the PDN connection comprises a Dedicated Bearer Activation Procedure, a UE requested bearer resource modification procedure, or a Secondary PDP Context Activation Procedure.

A person skilled in the art shall appreciate that the apparatus for notifying connection attributes of local IP access as illustrated in FIG. 6 is set for achieving the previous method for notifying connection attributes of local IP access, wherein the function of each unit and each module in the apparatus as illustrated in FIG. 6 can refer to the depiction of the method illustrated in FIG. 3-FIG. 5 for understanding and the function of each unit and each module can be implemented by the program run in the processor and can also be implemented by the specific logical circuit.

The foregoing is only the preferred embodiments of the invention but not intended to limit the protection scope of the invention.

What is claimed is:

1. A method for notifying a connection attribute, comprising:

implementing, by a user equipment (UE), an attach procedure so that the UE is attached to a network;

initiating, by the UE, a PDN Connectivity request to a mobility management element via a radio side network element;

judging, by the mobility management element, whether a local IP access (LIPA) connection or a core network connection needs to be established for purpose of determining a connection attribute of connection between the UE and network, wherein when it is judged that the core network connection needs to be established, the connection attribute is the core network connection, and when it is judged that the LIPA connection needs to be established, the connection attribute is the LIPA connection;

sending, by the mobility management element, to the radio side network element a bearer setup request message and a PDN connectivity accept message, wherein the connection attribute is included in the PDN connectivity accept message;

sending, by the radio side network element, to the UE the PDN connectivity accept message including the connection attribute;

replying, by the radio side network element, to the mobility management element with a bearer setup response; and implementing, by the mobility management element, a bearer update process.

2. The method according to claim 1, the initiating step further comprises: forwarding the PDN Connectivity request to a home base station gateway by the UE, and sending the PDN Connectivity request to the mobility management element by the home base station gateway.

3. The method according to claim 1, wherein the mobility management element comprises a Mobility Management Entity (MME), a Mobile Switching Center (MSC) or a Serving GPRS Support Node (SGSN).

4. The method according to claim 1, wherein the judging step is based on local access identifiers carried in the PDN Connectivity request.

5. The method according to claim 1, wherein types of the LIPA connection comprises: internet LIPA connection, home network LIPA connection, user local LIPA connection, and intranet LIPA connection.

6. The method according to claim 1, comprising: providing a local access gateway located at the radio side network element for user service, and initiating, by the mobility management element, a session establishment procedure to the local access gateway.

7. The method according to claim 1, wherein the connection attribute is borne in an existing information element in the PDN connectivity accept message, or in a new information element added in PDN connectivity accept message.

8. The method according to claim 1, wherein before the sending, by the radio side network element, to the UE the PDN connectivity accept message including the connection attribute, the method further comprises configuring a RRC connection between the radio side network element and the UE.

9. The method according to claim 1, wherein after the replying, by the radio side network element, to the mobility management element with a bearer setup response, the method further comprises:

sending, by the UE, to the radio side network element a direct transfer message which comprises a PND connectivity complete message; and sending, by the radio side network element, the PDN connectivity complete message to the mobility management element.

10. A system for notifying a connection attribute, comprising a user equipment (UE), a mobility management element, and a radio side network element; wherein
   the UE implements an attach procedure so that the UE is attached to a network;
   the UE initiates a PDN Connectivity request to the mobility management element via the radio side network element;
   the mobility management element judges whether a local IP access (LIPA) connection or a core network connection needs to be established for purpose of determining a connection attribute of connection between the UE and the network, wherein when it is judged that the core network connection needs to be established, the connection attribute is the core network connection, and when it is judged that the LIPA connection needs to be established, the connection attribute is the LIPA connection;
   the mobility management element sends to the radio side network element a bearer setup request message and a PDN connectivity accept message, wherein the connection attribute is included in the PDN connectivity accept message;
   the radio side network element sends to the UE the PDN connectivity accept message including the connection attribute;
   the radio side network element replies to the mobility management element with a bearer setup response; and
   the mobility management element implements a bearer update process.

11. The system according to claim 10, further comprising a home base station gateway, wherein the UE forwards the PDN Connectivity request to the home base station gateway, and the home base station gateway sends the PDN Connectivity request to the mobility management element.

12. The system according to claim 10, wherein the mobility management element comprises a Mobility Management Entity (MME), a Mobile Switching Center (MSC) or a Serving GPRS Support Node (SGSN).

13. The system according to claim 10, wherein types of the LIPA connection comprises: internet LIPA connection, home network LIPA connection, user local LIPA connection, and intranet LIPA connection.

14. The system according to claim 10, comprising a local access gateway located at the radio side network element for user service wherein the mobility management element initiates a session establishment procedure to the local access gateway.

15. A method for notifying a connection attribute, comprising:
   implementing, by a user equipment (UE), an attach procedure so that the UE is attached to a network;
   sending, by the UE, an Activate PDP Context Request message to a mobility management element through a radio side network element;
   judging, by the mobility management element, whether a local IP access (LIPA) connection or a core network connection needs to be established for purpose of determining a connection attribute of connection between the UE and network, wherein when it is judged that the core network connection needs to be established, the connection attribute is the core network connection, and when it is judged that the LIPA connection needs to be established, the connection attribute is the LIPA connection;
   sending, by the mobility management element, a Create PDP Context Request to a Local Gateway GPRS Support Node (L-GGSN), and replying, by the L-GGSN, to the mobility management element with a Create PDP Context Response;
   establishing a radio access bearer between the mobility management element and the radio side network element;
   sending, by the mobility management element, an Update PDP Context Request to the L-GGSN, notifying the L-GGSN of modified QoS parameters, and replying, by the L-GGSN, to mobility management element with an Update PDP Context Response; and
   after the radio access bearer is established, sending, by the mobility management element, an Activate PDP Context Accept message to the UE through the radio side network element, wherein the connection attribute is included in the Activate PDP Context Accept message.

16. The method according to claim 15, wherein the mobility management element comprises a Mobility Management Entity (MME), a Mobile Switching Center (MSC) or a Serving GPRS Support Node (SGSN).

17. The method according to claim 15, wherein when a modification procedure is initiated to the radio access bearer, the mobility management element needs to notify the UE of a connection attribute of the radio access bearer.

* * * * *